3,167,476
PREPARATIONS ACTING ON THE CENTRAL NERVOUS SYSTEM AND THE MANUFACTURE THEREOF
Iván László Bonta, Oss, Netherlands, assignor to Organon Inc., West Orange, N.J., a corporation of New Jersey
Filed Feb. 26, 1963, Ser. No. 261,181
Claims priority, application Netherlands, Mar. 14, 1962, 275,964
3 Claims. (Cl. 167—65)

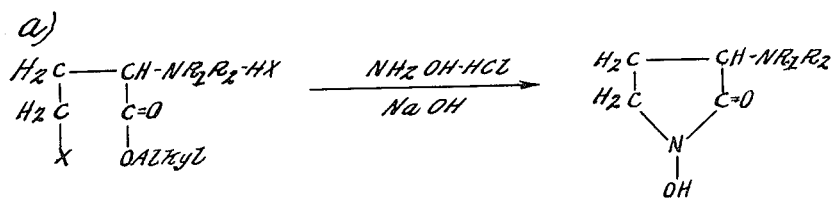
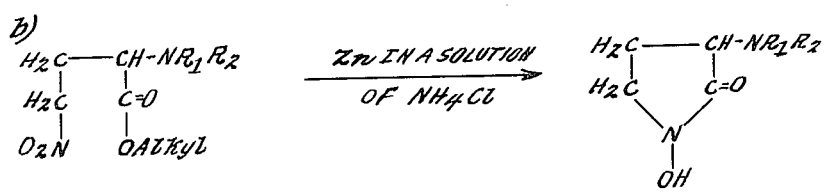
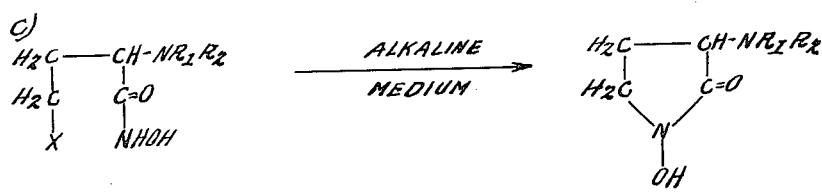
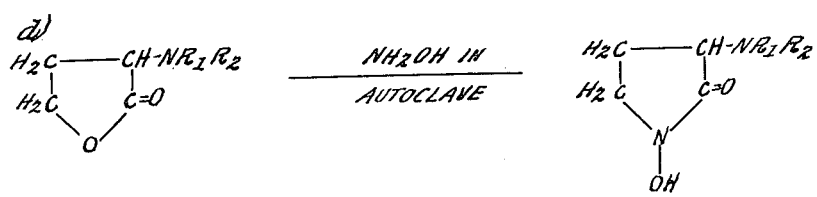
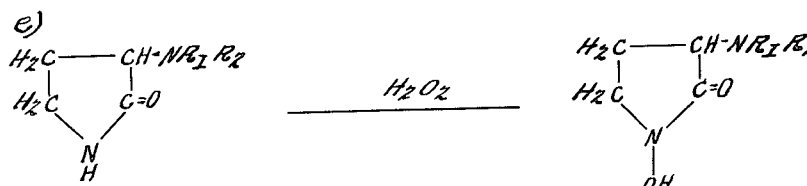

The invention relates to pharmaceutical preparations acting on the central nervous system and is characterized in that at least one of the compounds of the general formula:

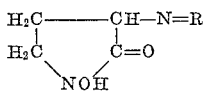

in which R is a member of the group consisting of a radical forming a heterocyclic ring with the adjacent nitrogen atom and $R_1$, $R_2$, in which $R_1$ and $R_2$ are similar or dissimilar and represent hydrogen or an aliphatic, aromatic, araliphatic or acyl radical, is applied as active substance, and to their manufacture.

Of the group of compounds used as active substance in the present preparations the compound of the above formula in which $R_1$ and $R_2$ represent hydrogen is known (see Coll. Czech. Chem. Commun. 24, 1672 (1959)), but not any of its biological activities has been described. As far as known the other compounds represented by the general formula

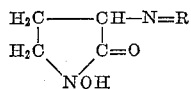

in which

R has the same meaning as stated above, $R_1$ represents a member of the group consisting of an aliphatic, aromatic, and acyl radical and $R_2$ represents a member of the group consisting of hydrogen, an aliphatic, aromatic radical have not been mentioned in the literature.

It has been found now that the said compounds have a depressory action on the central nervous system, while their toxicity is very slight. Thus it has been found that in mice the active and the lethal dose are in the ratio of 1:30. This action on the central nervous system is selective so that on administration there occur no undesired side effects on the respiratory and circulation functions. The compounds are very active, both on oral and on parenteral administration. Owing to their favourable properties they are especially useful in the treatment of various kinds of epilepsy and in the case of Parkinson's disease.

It has been found that 1-hydroxy-3-amino-pyrrolidone-2 possesses a very strong antitremor activity. For preference the present preparations are prepared in solid dosage unit forms, such as tablets, pills and coated tablets each containing 5–500 mg. of the active compound. A very suitable dosage unit contains 40–400 mg. of the active substance. The active substance is contained in the preparations in a pharmaceutical vehicle, such as lactose, starch, sugar and dextrin, together with other conventional excipients, such as stearic acid, magnesium stearate, gelatin, and the like. Solid dosage unit forms may also be administered rectally, using in this case auxiliaries suitable for this form of administration.

Though as stated above administration of solid dosage unit forms is preferred, it is also possible to incorporate active substances in liquids for oral administration.

For parenteral administration the compounds are dissolved in a vehicle suitable for this purpose. For injection preparations a concentration of 20–40 mg./ml. has proved to be very suitable.

The compounds to be used in the present preparations can be prepared in any manner known for such compounds.

The attached sheet shows the Equations a–e representing some possible methods of preparation of the compounds used, while the preparation of a number of the relative compounds is illustrated further in the examples.

In Equation a, X represents a chlorine, iodine or bromine atom; $R_1$ and $R_2$ are similar or dissimilar and represent hydrogen or an aliphatic, aromatic, or acyl radical or form a heterocyclic ring together with the adjacent nitrogen atom. In this reaction it is not necessary to use the ester of the acid. It is also possible to start from the anhydride or a mixed anhydride or form another derivative of the relative acid of which it is known that they are suitable for the formation of a

band.

In the equation the hydroxam acid, which is formed as an intermediate product, is not indicated. In the British patent specification 535,430 a corresponding method of preparation is described of 2,4-dioxo-3,3-dialkyl-pyrrolidine by reacting ammonia with the α,α-dialkyl-γ-haloaceto acetic ester in the presence of a solvent.

In Equation b, $R_1$ and $R_2$ have the same meaning as stated above. In J. Chem. Soc. 1959, page 2096, mention is made of the preparation of 1-hydroxy-5,5-dimethyl-pyrrolidone-2 by reduction of 4,4-dimethyl-nitrobutyric acid ester with zinc in a solution of ammonia chloride.

In Equation c, X, $R_1$ and $R_2$ have the same meaning as stated above. The hydroxam acids can be prepared from the corresponding carboxylic acids in the conventional manner. They are important as an intermediate product for the preparation of the active compounds according to the invention.

In Helv. Chem. Acta 40, 1531 (1957) the closure of the ring is described of α-amino-β-chloro-hydroxam acid to cycloserine under the influence of alkali. As contrasted with this the α-amino-γ-chloro-hydroxam acid forms no homocycloserine, but the 1-hydroxy-3-amino pyrrolidone-2.

In Equation d, $R_1$ and $R_2$ have the meaning stated above. German Patent Nr. 812,551 describes the formation of N-substituted 3-amino-pyrrolidone-2 compounds by reacting γ-lactones with a primary amine at a high pressure and temperature in the presence of an inert solvent and dehydrating agents.

In Equation e, $R_1$ and $R_2$ have the meaning as stated above. By using an organic peroxide in this reaction instead of hydrogen peroxide derivatives can be obtained having a substituted hydroxyl group at the nitrogen atom incorporated in the ring.

Another method for the preparation of the compounds substituted in the 3-amino group consists in the introduction of the desired substituents into the amino group of 1-hydroxy-3-amino-pyrrolidone-2 in a manner known in the art.

Clinical investigations with the 1-hydroxy-3-amino-pyrrolidone-2 yielded the following favourable results. To 18 patients showing all of them a distinct tremor 3×100 mg. were orally administered daily for two weeks. It proved then that 13 cases of extra pyramidal tremor reacted most favourably to this treatment, for there occurred a strong reduction of the tremor when no undesirable side-effects were observed.

After treatment of 4 patients suffering from Parkinson's disease with 2 to 3×100 mg. daily a distinct reduction of the tremor with no undesirable side-effects was noticed after 14 days.

The manufacture of the present preparations and the compounds to be used in this process is further illustrated in the following examples.

*Example I*

75 g. of lactose are mixed with a solution of 0.75 g. of gelatin in 7.5 ml. of water. The mixture is processed to a dry granulate. To this granulate 25 g. of 1-hydroxy-3-amino-pyrrolidone-2, 1.5 g. of stearic acid, 20 g. of potato starch and 27.75 g. of talc are added. After mixing the mass obtained is tableted into 500-mg. tablets each containing about 80 mg. of the active compound.

*Example II*

Mix 81.5 g. of lactose and 25 g. potato starch with a solution of 1.0 g. of gelatin in 10 ml. of water. The mixture is processed into a dry granulate, which is mixed with 100 g. of 1-hydroxy-3-dimethyl-aminopyrrolidone-2, 25 g. of potato starch, 25 g. of stearic acid and 12.5 g. of talc. The resulting mixture is tableted into 250-mg. tablets each containing 100 mg. of the active compound.

*Example III*

Tablets are made as indicated in Example I, but this time the mass is tableted into 100-mg. tablets each containing about 16 mg. of the active compound.

*Example IV*

Tablets are made in accordance with Example I, but in these tablets the 1-hydroxy-3-morpholino-pyrrolidone-2 is taken up as active substance.

*Example V*

A solution is prepared of 25 g. of 1-hydroxy-3-amino-pyrrolidone-2 in 1 l. of distilled pyrogen-free water. To the resulting solution so much sodium chloride is added till the solution is isotonic. The liquid is passed into 2-ml. ampoules, after which these ampoules are sterilised. Each ampoule contains 50 mg. of the active compound.

*Example VI.—1-hydroxy-3-amino-pyrrolidone-2*

At a temperature of −5° C. 5.6 g. of the hydrochloride of the α-amino-γ-chloro-butyric methyl ester (prepared according to Frankel and Knobber, J. Am. Soc. 80, (1958)) are added to a mixture of 5.2 g. of sodium hydroxide, 3.1 g. of the hydrochloride of hydroxylamine and 11.3 ml. of distilled water. The reaction mixture is stirred for 3 hours at 0° C. and after that for 1 hour at 30° C. After cooling to −10° C. the pH is adjusted at a value of 5, 6 with hydrochloric acid, whereupon 6.3 g. of di-ethylamine are added.

For removal of inorganic salts the reaction mixture is next poured into 150 ml. of absolute alcohol of 60° C. and kept at this temperature for 15 minutes. After cooling to 0° C. the mixture is filtered, after which the filtrate is adjusted at pH 6 with glacial acetic acid. The resulting precipitate is filtered off, washed with alcohol and ether and dried in vacuo over $P_2O_5$. After recrystallising a few times from ethanol the melting point of the resulting 1-hydroxy-3-amino-pyrrolidone-2 is 184° C. (decomposition).

*Example VII.—1-hydroxy-3-benzoylamino-pyrrolidone-2*

In the same manner as described in Example VI the 1-hydroxy-3-benzoylamino-pyrrolidone-2 is prepared starting from the α-benzoylamino-γ-bromo-butyric acid methyl ester.

*Example VIII.—1-hydroxy-3-acetylamino-pyrrolidone-2*

In the same manner as described in Example VI the 1-hydroxy-3-acetyl-amino-pyrrolidone-2 with melting point 148.5°–150.5° C. is prepared starting from the α-acetyl-amino-γ-chloro-butyric acid methyl ester.

*Example IX*

In the same manner as described in Example VI the 1-hydroxy-3-morpholino-pyrrolidone-2 is prepared starting from the α-morpholino-γ-chloro-butyric acid methyl ester.

*Example X*

In the manner as described in Example VI the 1-hydroxy-3-dimethyl-amino-pyrrolidone-2 with melting point 124.0°–126.5° C. is prepared starting from α-dimethyl-amino-γ-chloro-butyric acid methyl ester.

*Example XI.—1-hydroxy-3-glycylamino-pyrrolidone-2*

Benzyloxycarbonylglycine (4.8 g.) was dissolved in 25 ml. of tetrahydrofuran. After cooling down to a temperature of −40° C. 2.74 ml. of N-ethylpiperidine were added while stirring and next 1.91 ml. of ethylchloroformate. After that the temperature was raised to −10° C. which temperature was maintained for 15 minutes. Next the mixture was cooled down to −40° C. and the precipitate formed consisting of N-ethylpiperidine HCl filtered. At −20° C. a pre-cooled solution of 2.78 g. of 1-hydroxy-3-amino-pyrrolidone-2 and 3.28 ml. of N-ethylpiperidine dissolved in 20 ml. of water were added to the filtrate. Next the temperature of the reaction mixture was raised to room temperature, which temperature was maintained for 2 hours. Next the solvent was entirely evaporated. The residue was taken up in 100 ml. of water and purified over an acid ion exchanger. Finally the 1-hydroxy-3-(benzyloxycarbonylglycyl) amino-pyrrolidone-2 was obtained from the eluate in 1.62 g. yield by lyophilisation. By means of palladium and hydrogen the benzyloxycarbonyl group was split off to obtain 0.90 g. of the final product. After recrystallisation from absolute alcohol the compound showed an $R_f$ of 0.13 in a mixture of butanol-acetic acid-water (4:1:5).

What is claimed is:

1. A composition having a depressory action on the central nervous system containing as active ingredient from about 40 to about 400 mg. of a compound of the formula:

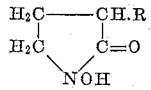

wherein R is selected from the group consisting of amino, dimethylamino, acetylamino, benzoylamino, glycylamino, and morpholino, which ingredient is dispersed in a pharmaceutically acceptable carrier.

2. A composition in accordance with claim 1 in which the active ingredient is 1-hydroxy-3-amino-pyrrolidone-2.

3. A pharmaceutical composition in solid dosage unit form, each unit containing from about 5 to about 500 mg. of 1-hydroxy-3-amino-pyrrolidone-2 as active ingredient, in a pharmaceutically acceptable carrier.

References Cited by the Examiner

UNITED STATES PATENTS

| | | | |
|---|---|---|---|
| 2,955,073 | 10/60 | De Beer | 167—65 |
| 3,035,977 | 5/62 | Abood | 167—65 |
| 3,057,874 | 10/62 | Ney | 260—326.3 |
| 3,060,194 | 10/62 | Song | 260—326.3 |

OTHER REFERENCES

Mautner: Chem. Abst., vol. 53, page 22974(i), 1959.
Smrt: Chem Abst., vol. 53, page 20035(i), 1959.

JULIAN S. LEVITT, *Primary Examiner.*
F. CACCIAPAGLIA, JR., *Examiner.*